(No Model.)

A. G. HAY.
ENGINE VALVE.

No. 603,380.

3 Sheets—Sheet 2.

Patented May 3, 1898.

Witnesses
E. C. Wurdeman
S. S. Williamson

Inventor
Alexander G. Hay
by Geo. H. Holgate
Attorney

THE NORRIS PETERS CO., PHOTO-LITHO., WASHINGTON, D. C.

(No Model.)  
A. G. HAY.  
ENGINE VALVE.
3 Sheets—Sheet 3.
No. 603,380. Patented May 3, 1898.
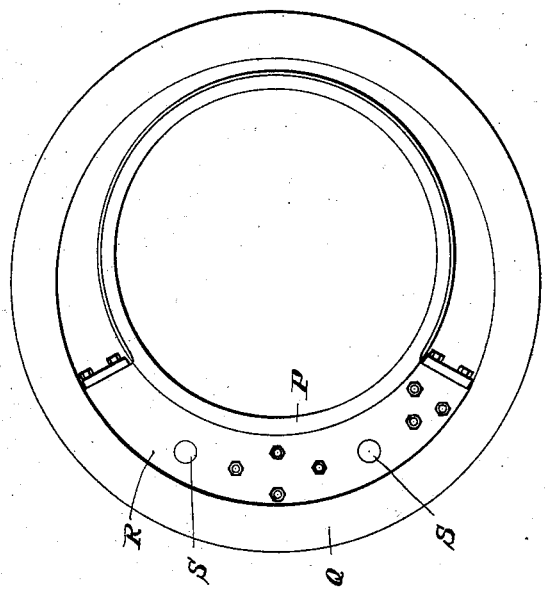
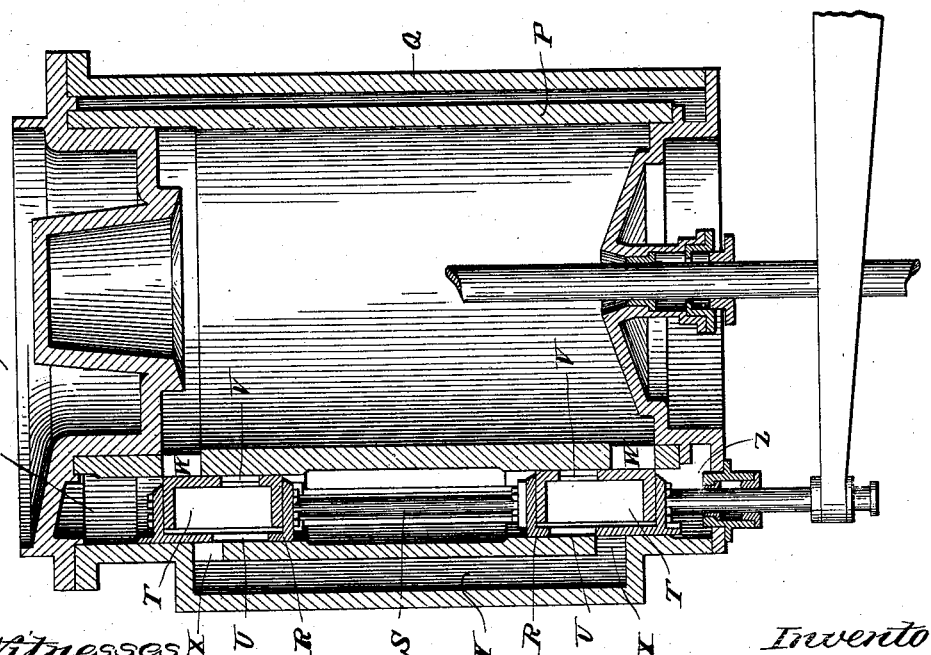
Witnesses  
E. C. Wurdeman  
S. Williamson
Inventor  
Alexander G. Hay  
by Geo. H. Hogate  
Attorney

UNITED STATES PATENT OFFICE.

ALEXANDER G. HAY, OF PHILADELPHIA, PENNSYLVANIA.

ENGINE-VALVE.

SPECIFICATION forming part of Letters Patent No. 603,380, dated May 3, 1898.

Application filed June 21, 1897. Serial No. 641,725. (No model.)

*To all whom it may concern:*

Be it known that I, ALEXANDER G. HAY, a citizen of the United States, residing at Philadelphia, in the county of Philadelphia and State of Pennsylvania, have invented a certain new and useful Improvement in Engine-Valves, of which the following is a specification.

My invention relates to a new and useful improvement in valves for engines, and is especially adapted for use in connection with multiple-cylinder marine engines, and has for its object to so construct and arrange a valve of this description as to greatly economize space, do away with the necessity of a steam-chest, utilize the live exhaust-steam in the course of its induction and escape to prevent radiation from the cylinder, and at the same time balance the valve by the steam action.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1:
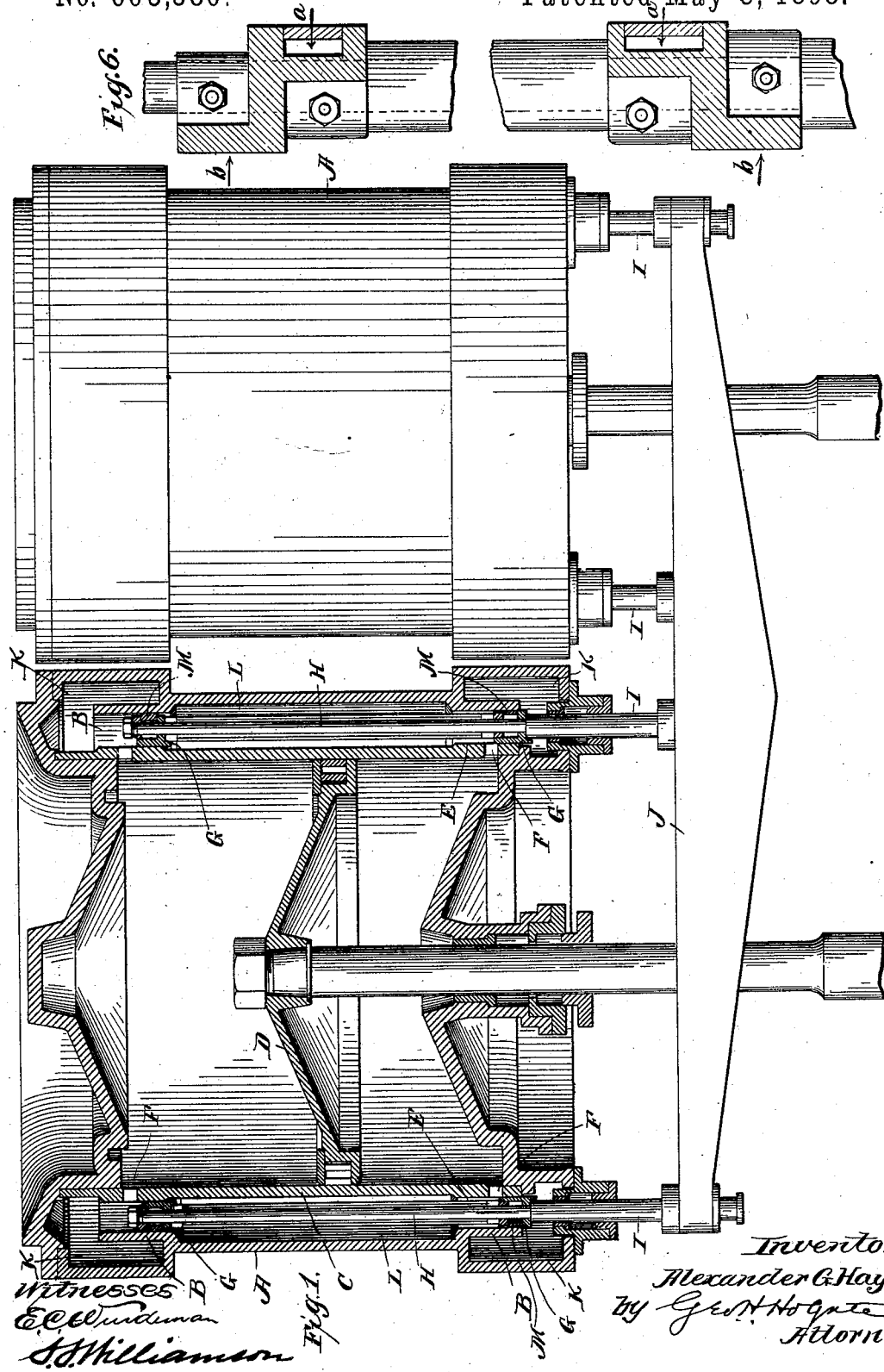
Figure 2:
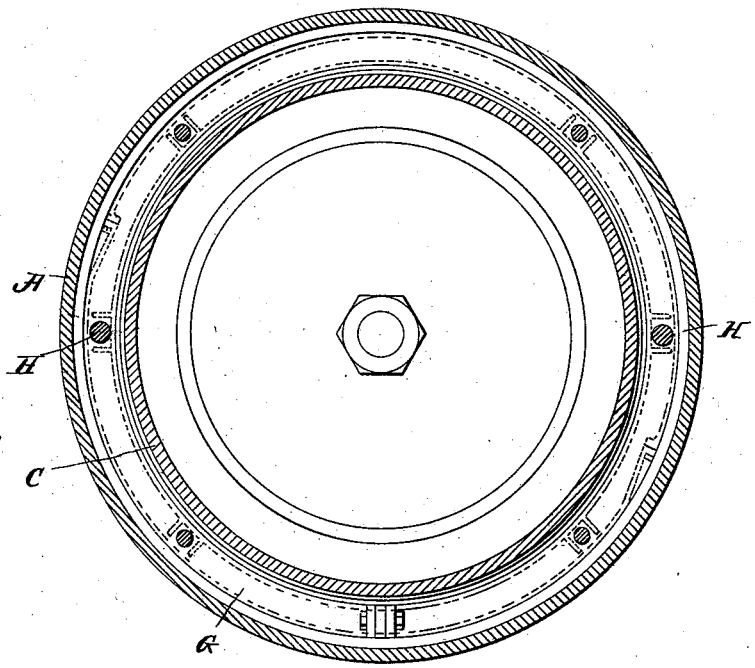
Figure 3:
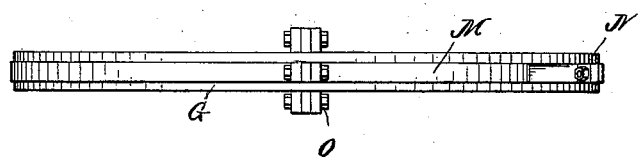

Figure 1 shows one cylinder in elevation while the other is in section, thereby illustrating the arrangement of the several parts of the valve and its relation to the cylinder. Fig. 2 is a cross-section of one of the cylinders at the line $x\ x$; Fig. 3, a detail view of one of the valve-rings; Fig. 4, a slight modification of my improvement, showing the outer casing of the cylinder arranged concentric to the lining, by means of which arrangement it is not necessary to carry the valve completely around the cylinder. Fig. 5 is a cross-section of this modification, and Fig. 6 a slight modification of the valve.

In carrying out my invention as embodied in Figs. 1, 2, and 3 I form the cylinder-casing A in the usual manner by casting and leave therein bands of small diameter, which may be finished to form bearing-surfaces for the valves, as indicated at B, and within this casing is placed a lining or tubular shell C, adapted to receive the piston D, which latter may be of usual construction. Around the outer circumference of the lining C are formed bands of larger diameter than the body thereof, and these bands are finished so as to serve to form bearing-surfaces for the valves, as indicated at E, and through these bands are the ports F for the induction and escape of the steam.

The valve proper consists of two annular sections G, fitted between the bearing-surfaces B and E after the manner of a piston-valve, and these sections are coupled together by means of the rods H, so as to become one moving member of the engine. The valve thus constructed has leading therefrom the valve-stems I, which are here shown as connected to a yoke J, and in combined, triple, or quadruple engines this yoke may be of sufficient length to carry the valve-stems to two of the cylinders, for the purpose well known.

The arrangement of the valve-sections is such that the space between the lining and the outer casing of the cylinder is divided into three compartments, the two outer compartments K serving as induction-passages, while the inner compartment L serves as the exhaust-way, from which it will be obvious that when the valve is given its proper movement steam will enter from one of the induction-compartments to the cylinder, and when the movement of the piston is reversed this steam will be exhausted by the proper movement of the valve into the compartments L and from thence to the next cylinder or condenser, as the case may be. By thus conveying the steam to the cylinder and exhausting it therefrom it will be seen that said cylinder is always maintained at a high temperature, thereby preventing radiation or condensation, which would otherwise take place were the cylinder exposed to the atmosphere or only protected by the ordinary jacket.

Each section of the valve is composed of flat annular plates of such dimension as to fit within the space between the bearings B and E, and between each set of these plates is placed the packing-ring M, which may be varied in its adjustment by means of the bolt and nut N. The plates are likewise made in sections and secured together by means of the bolts O, or any other arrangement may be provided for the snug packing of the sections of the valve, so as to compensate for expansion and contraction occasioned by the variance of the temperature of the parts. Much economy of space is effected by my improvement, as well as the other advantages gained thereby, since four cylinders may be arranged into the same space as that heretofore occupied by three cylinders, and since no condensation will take place in the cylinders on account of the hot temperature at which the lining thereof is maintained my improvement is especially applicable for marine purposes.

In the modification shown in Figs. 4 and 5 I accomplish the same result as that above described by arranging the lining P eccentric with the outer casing Q of the cylinder, thus enlarging one side of the space between the lining and casing, and in this enlargement of the space is fitted the valve, which consists of the two sections R, connected together by the rods S, so as to move in unison. Each of these sections forms segmental boxes having cavities T therein, and from these cavities lead openings U and V, the latter adapted to pass into and out of alinement with the ports W, while the former are adapted to register with the steam-passages X. By this arrangement the live steam is conducted to the compartment and passes through the openings X into the valve-boxes and from thence to the ports, while the steam which is exhausted passes to one or the other of the compartments Z. This construction under some circumstances is as desirable as that first described; but I do not wish to be limited to the exact details of construction here shown, since these may be varied without departing from the spirit of my invention.

The modification shown in Fig. 6 is so arranged that the steam-pressure indicated by the arrow $a$ will balance the steam-pressure indicated by the arrow $b$, as will be readily understood.

Having thus fully described this invention, what is claimed as new and useful is—

1. In combination, an engine-cylinder consisting of an outer casing, and an inner lining so arranged that a space is formed between them, bearings formed at each end of said members, and a valve composed of two sections each section consisting of two plates adapted to fit in the space between the cylinder and lining, and a packing-ring between the plates and a bolt and nut for adjusting the packing-ring, as and for the purpose described.

2. In combination, a cylinder having two outwardly-projecting flanges at its ends forming a space between them serving as an induction-passage, a lining concentric with the cylinder and at such a distance therefrom as to leave a space, bearings formed on the inner flange and at the ends of the lining, valves composed of two sections each section consisting of two annular plates placed one above the other in the space between the bearings, packing-rings placed between the plates and a nut and bolt for adjusting the packing-rings, and rods connecting the sections, as and for the purpose described.

In testimony whereof I have hereunto affixed my signature in the presence of two subscribing witnesses.

ALEXANDER G. HAY.

Witnesses:
S. S. WILLIAMSON,
F. MATTNER.